United States Patent [19]

Kirma

[11] Patent Number: 5,207,543

[45] Date of Patent: May 4, 1993

[54] CONNECTING DEVICE WITH A NUT AND BOLT TO PREVENT LOOSENING AND LOSING THE NUT

[75] Inventor: Safa Kirma, Wedel/Holstein, Fed. Rep. of Germany

[73] Assignee: Deutsche Aerospace Airbus GmbH, Hamburg, Fed. Rep. of Germany

[21] Appl. No.: 905,244

[22] Filed: Jun. 26, 1992

[30] Foreign Application Priority Data

Jun. 28, 1991 [DE] Fed. Rep. of Germany ....... 4121524

[51] Int. Cl.⁵ .................. F16B 39/10; F16B 39/30; F16B 39/284
[52] U.S. Cl. .................... 411/121; 411/193; 411/206; 411/927
[58] Field of Search .................. 411/119–121, 411/193–200, 351, 926, 927, 946, 970, 192, 206, 207

[56] References Cited

U.S. PATENT DOCUMENTS

| | | | |
|---|---|---|---|
| 510,510 | 12/1893 | Johnson | 411/206 |
| 984,134 | 2/1911 | Gilbert | 411/927 X |
| 998,796 | 7/1911 | Palmer | 411/192 |
| 1,120,393 | 12/1914 | Le Compte | 411/927 X |
| 1,143,247 | 6/1915 | Bates | 411/927 X |
| 3,512,565 | 5/1970 | Zezza | 411/926 X |

Primary Examiner—Neill R. Wilson
Attorney, Agent, or Firm—W. G. Fasse

[57] ABSTRACT

A nut and a screw bolt form a screw connector, wherein the nut is secured to the bolt by a configured spring locking member. The locking member engages with one end the screw bolt and with the other end the nut, whereby the locking member has such a configuration that one end has a projection to engage a cotter pin hole in the bolt, while the other end engages directly or indirectly the nut. The two locking member ends are interconnected by a spring section which has such a configuration that a nut tightening torque moment is exerted on the nut when the locking member is in place. Further, the locking member is so configured that it exerts an axial compression force when its ends engage the bolt and the nut. This construction minimizes any reduction in the force exerted by the screw connector on the interconnected structural components. Additionally, any torque moment tending to loosen the nut is counteracted or prevented so that the screw connector is secured against loosening, against turning the nut in a loosening direction and losing the nut is also prevented.

11 Claims, 9 Drawing Sheets

CONNECTING DEVICE WITH A NUT AND BOLT TO PREVENT LOOSENING AND LOSING THE NUT

FIELD OF THE INVENTION

The invention relates to a connecting device also referred to as connector with a nut and bolt, including a safety mechanism for preventing the loosening of the nut from the threading of the bolt which has a hole for a cotter pin. The safety mechanism includes a locking element that engages the nut and the bolt.

BACKGROUND INFORMATION

Connectors of this type use, for example, a crown nut according to German Industrial Standards, Sheets DIN 935 or DIN 937. A cotter pin type member functions as a locking element which engages the screw bolt and the nut. For this purpose the crown nut is provided with slots spaced from one another circumferentially by 60° sectors. The crown nut can thus be adjusted only in 60° steps. This is a disadvantage because when it is necessary to turn the nut by a full 60° in order to reach the next cotter hole, it is quite possible that the bolt is exposed to an excessive strain, especially if the bolt is provided with a fine threading.

Another type of safety mechanism for preventing the loosening of a nut is known in the machine tool construction and uses a so-called safety washer having an inwardly turned nose according to German Industrial Standard DIN 462, suitable for nuts with a groove. This type of safety device is suitable for securing a nut at the end of a shaft. However, the threading of the shaft must be provided with a longitudinal groove for the nose of the safety washer. This type of construction is suitable only in machine tool construction because it is rather expensive. In bolt and nut connectors intended for use in general applications the formation of a longitudinal groove in the threading of the bolt is too expensive.

The above mentioned screw connectors provide an effective safety against losing the nut, since the nut is connected to the bolt, however, the known devices are not very effective against loosening and partial rotation of the nut relative to the threaded bolt.

OBJECTS OF THE INVENTION

In view of the foregoing, it is the aim of the invention to achieve the following objects singly or in combination:

to provide a bolt and nut connector for clamping structural components to each other in which the bolt is provided with a cotter hole or channel for cooperation with a safety mechanism that secures the nut against loosening and against any turning;

to construct a safety mechanism in such a way that it is in engagement with the nut and with the bolt during operation so that any loss in the clamping force due to creeping and permanent or plastic deformations is avoided;

to construct a safety mechanism for the above purposes in such a way that it has a minimum number of components which are primarily standardized;

to avoid a longitudinal groove in the threading of the bolt; and to construct the safety mechanism in such a way that it does not prevent a fine adjustment of the nut.

SUMMARY OF THE INVENTION

The safety mechanism according to the invention comprises at least one shaped spring member, one end of which engages a cotter pin hole or channel in the threaded end of the bolt, while the other end of the shaped spring is so configured that it engages the nut with a torque moment that tends to tighten the nut, said shaped spring member further having an intermediate section between said ends which is so configured that it exerts and axial compression force. The end of the shaped spring member that engages the cotter pin or lower channel is also referred to as the first spring end, while the other end engaging the nut is referred to as the second spring end.

It is a special advantage of the invention that any reduction of the clamping force exerted by the tightened nut on the interconnected structural components, is kept to a minimum during the time when such structural components are held together by the present connector device. Another advantage is seen in that the present safety mechanism blocks or prevents a nut loosening torque moment that could otherwise occur when there is a relative movement between the bolt and the nut. As a result, the present safety device protects the screw connector simultaneously against loosening, against rotation of the nut in a loosening direction, and also against losing the nut altogether.

BRIEF DESCRIPTION OF THE DRAWINGS

In order that the invention may be clearly understood, it will now be described, by way of example, with reference to the accomapnying drawings, wherein.

DETAILED DESCRIPTION OF PREFERRED EXAMPLE EMBODIMENTS AND OF THE BEST MODE OF THE INVENTION

Figure 1:
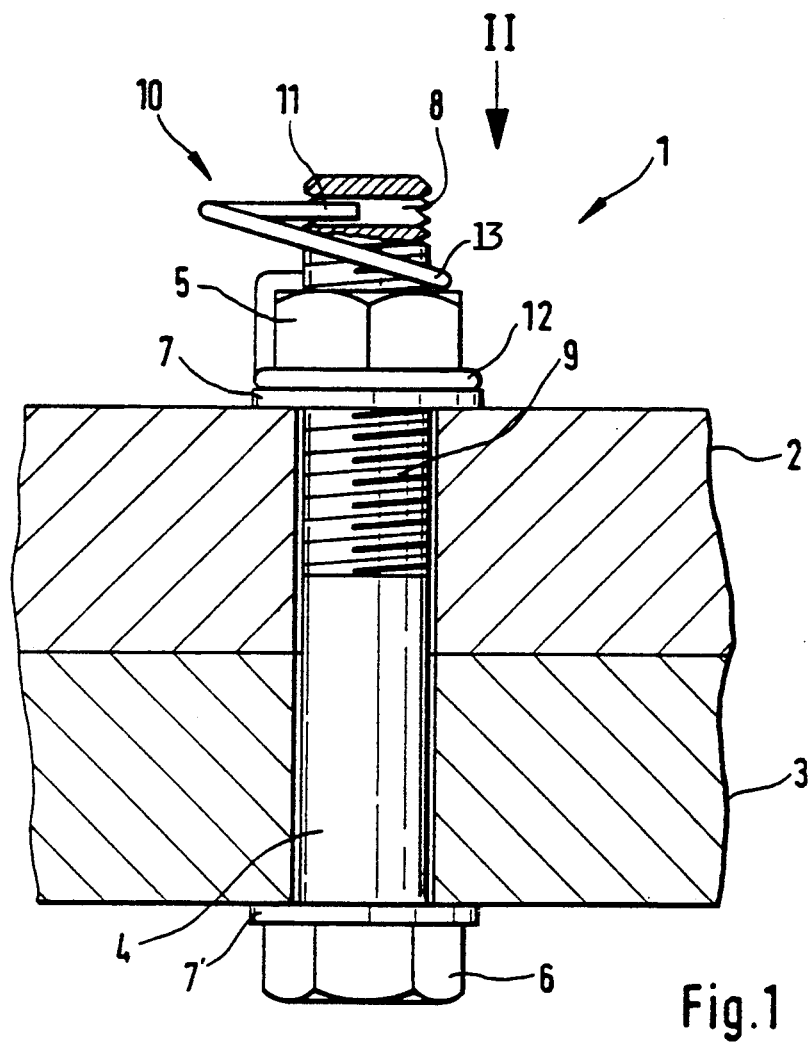
FIG. 1 is a sectional view through a connector device according to the invention, illustrating a first embodiment of a shaped spring forming a locking member.
Figure 2:
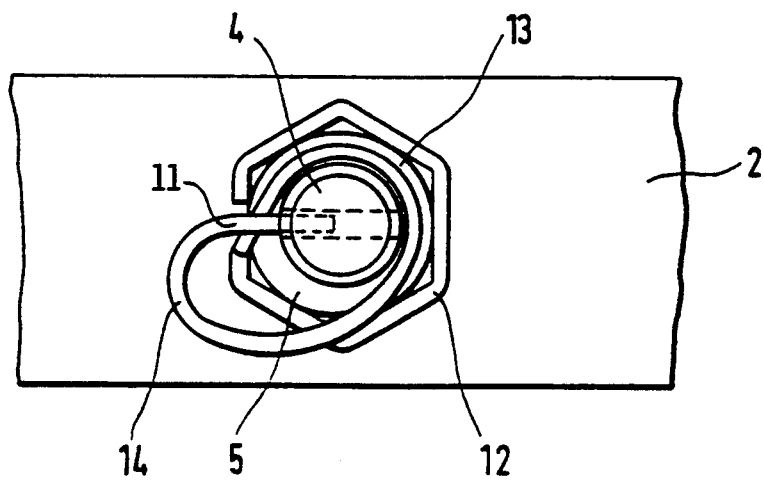
FIG. 2 is a top plan view in the direction of the arrow II in FIG. 1.

Referring to FIGS. 1 and 2, a screw connector 1 is used to hold two elements 2 and 3 together. The screw connector 1 comprises a bolt 4 and a nut 5. The bolt 4 has a head 6 pressing against a surface of the element 3 through a washer 7'. The bolt 4 further has a threaded end 9 cooperating with the nut 5 bearing against the surface of the element 2 through a washer 7. The outer free end of the bolt 4 is provided with a cotter pin hole or channel 8.

A locking member 10 in the form of a shaped elastic spring has a first end 11 received in the pin hole or channel 8 and a second end 12 engaging the nut 5 in a form-locking manner. The first end 11 and the second end 12 are interconnected by an intermediate shaped spring section 13. The intermediate spring section 13 is so formed and biased in its elasticity that the spring tends to tighten the nut 5 by reason of its engagement in a form-locking manner with the end 12. For this purpose the spring end 12 has a contour corresponding to that of the nut 5, for example, a hexagonal configuration or a polygonal shape. As best seen in FIG. 2, the first spring end 11 is connected through the intermediate spring section 13 and a loop 14 that may be used as a handle.

It is an advantage of the invention that the present locking device 10 can be applied after the nut and bolt connection with the elements 4, 9, 5, and 7, as well as 7' have been tightened by a determined torque moment. In order to apply the locking member 10, the polygonal end portion 12 is pushed onto the nut 5 until the end portion 12 contacts the washer 7. Then the free or first end 11 of the locking member 10 is turned clockwise around the screw end until the end 11 can be inserted into the next cotter pin hole or channel 8. If this should not be possible because the next cotter pin hole 8 cannot be reached, it is necessary to withdraw the end 12 of the locking member 10 from the nut 5 and to turn it by 60° clockwise and then to insert it again onto the nut 5, whereupon another attempt is made to insert the end 11 into the hole 8. The sense of rotation of the locking member 10 is such that it tends to rotate the nut in a tightening direction by a predetermined torque moment. Additionally, the locking member 10 has such a spring configuration that when the member 10 is mounted as shown in FIGS. 1 and 2, an axial compression is applied to the spring member 10, thereby urging the shaped end 12 against the washer 7.

Figure 3:
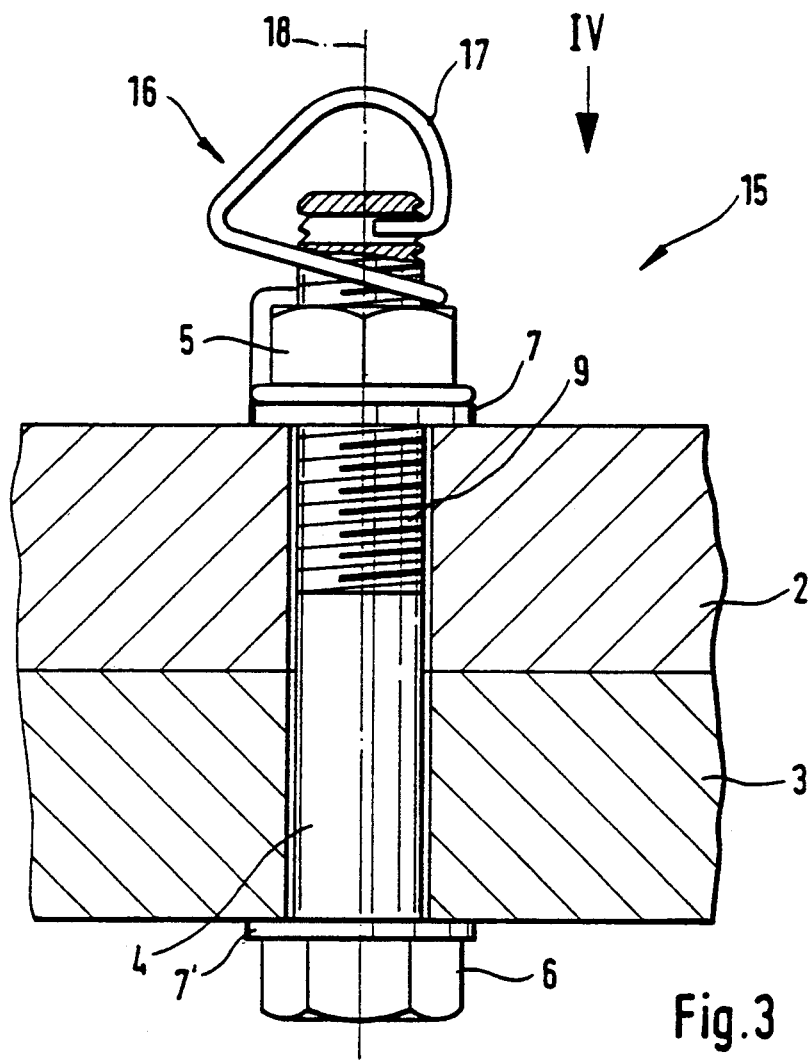
FIG. 3 is a view similar to that of FIG. 2, however, showing a modified locking member with a bail forming a handle or grip.
Figure 4:
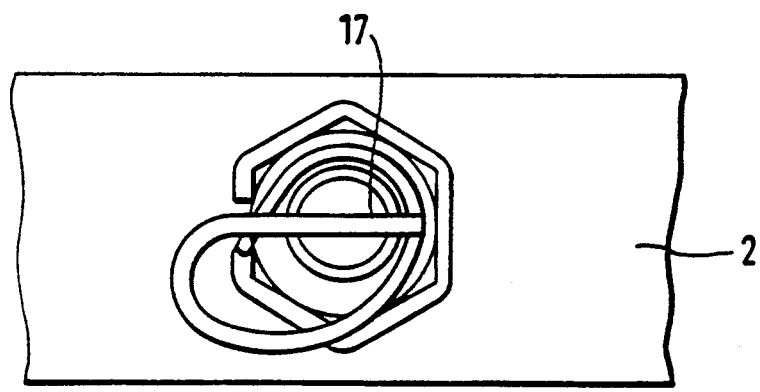
FIG. 4 is a view similar to that of FIG. 2 and showing a top plan view in the direction of the arrow IV in FIG. 3.

The embodiment of FIGS. 3 and 4 illustrates a screw connector 15 with the same elements 2 to 9 as described above with reference to FIGS. 1 and 2. The modification in FIGS. 3 and 4 is a shaped spring locking member 16 that differs from the locking member 10 by an eye that forms a handle bail 17. The handle bail 17 is so oriented that the longitudinal central axis 18 of the screw bolt 4 passes through the bail 17 so that the bail 17 is conveniently accessible as a handle. Thus, it is possible to mount the shaped spring locking member 16 manually. The function and operation is the same as described above.

Figure 5:
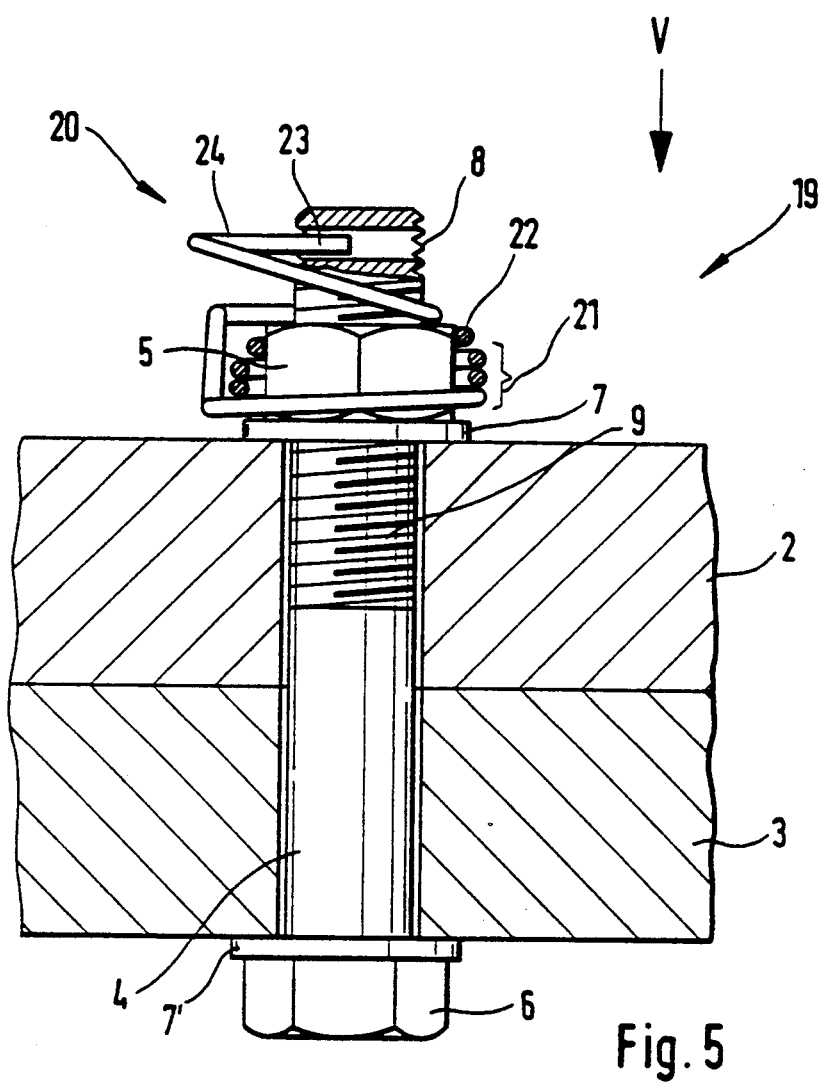
FIG. 5 shows an embodiment of a shaped spring forming a locking member with several spring windings.
Figure 6:
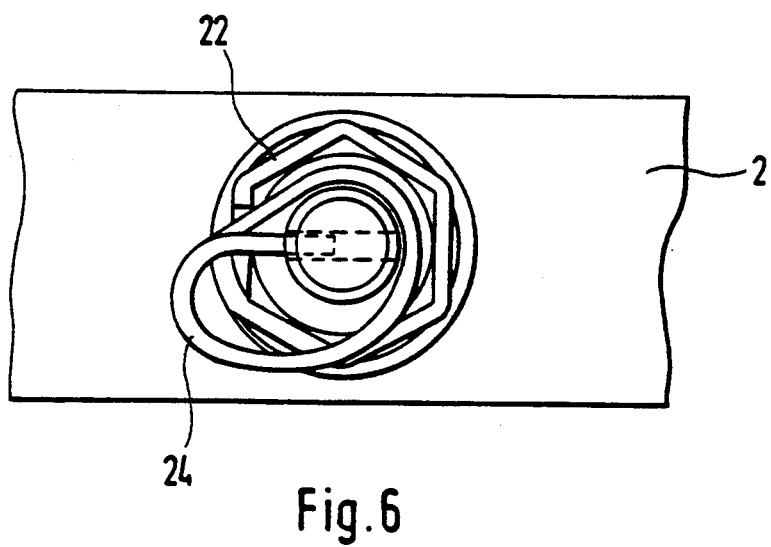
FIG. 6 is a top plan view in the direction of the arrow VI in FIG. 5.

The embodiment of FIGS. 5 and 6 shows a screw connector 19 which again comprises the above described elements 2 to 9 with a modified shaped spring locking member 20. The locking member 20 comprises a number of turns 21, a first locking end 23, and a polygonal section 22 above the plurality of windings 21 which surround the nut 5. The transition of the windings 21 into the first end 23 that engages the cotter pin hole 8, is formed by a laterally extending handle 24. By providing the intermediate section with several spring windings 21, it is possible to determine or select the torque moment that tends to tighten the nut 5 on the bolt 4.

Figure 7:
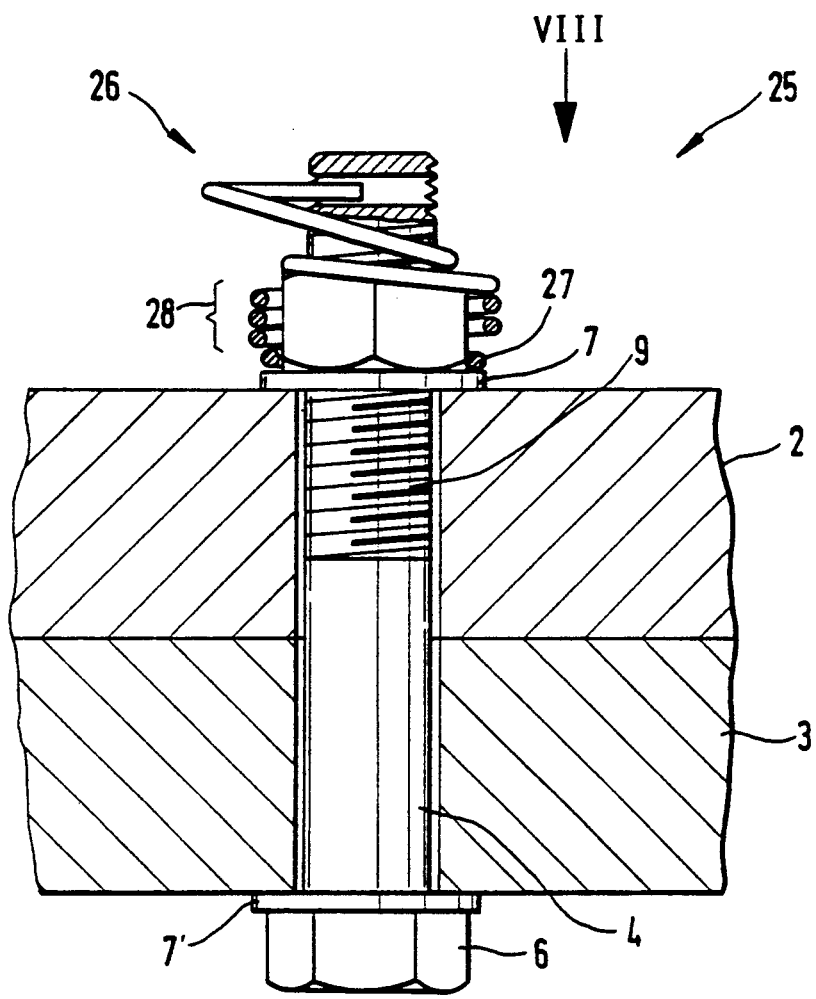
FIG. 7 shows a locking member in which the second, nut engaging end of the locking member has a polygonal configuration for tightly clamping a nut.
Figure 8:
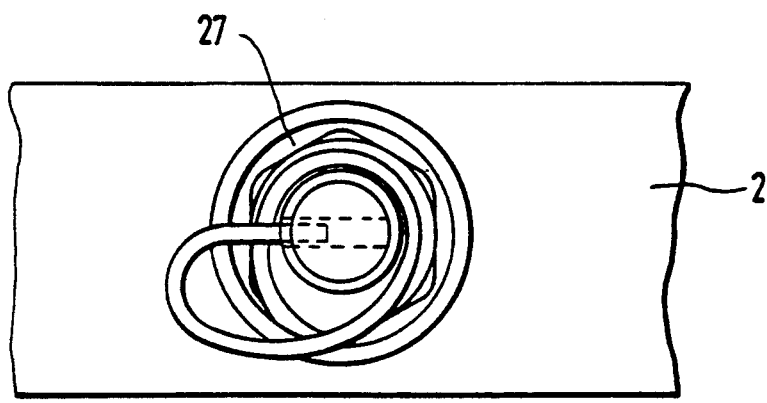
FIG. 8 is a top plan view in the direction of the arrow VIII in FIG. 7.

FIGS. 7 and 8 show a screw connector 25 with a shaped spring locking member 26 constructed substantially similarly to the locking member 20 in FIG. 5, however, with the difference that the polygonal spring section 27 is arranged below the windings 28 rather than the other way around. The function is the same as described above with reference to FIGS. 5 and 6. The number of windings 28 determine the torque moments that can be applied to tighten the nut 4.

Figure 9:
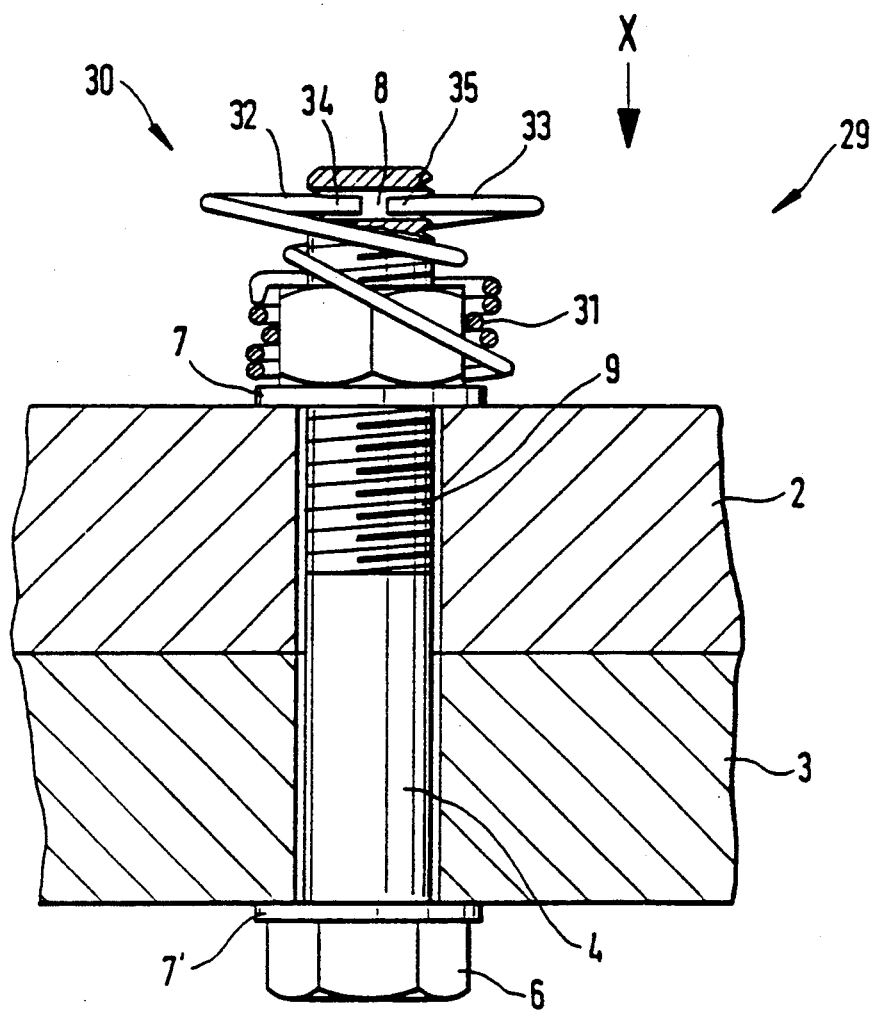
FIG. 9 illustrates a locking member in which the first and second end of the member both engage a cotter pin hole in the screw bolt, while an intermediate section of the locking member engages the nut.
Figure 10:
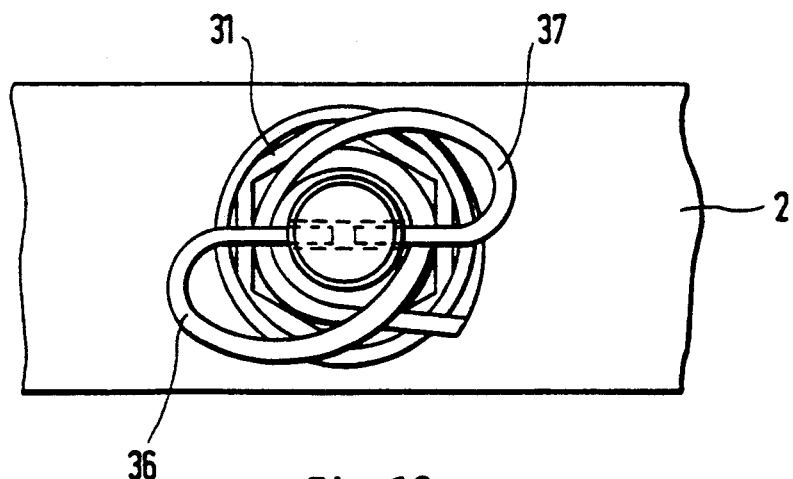
FIG. 10 is a top plan view in the direction of the arrow X in FIG. 9.

FIGS. 9 and 10 illustrate a screw connection 29 with a shaped spring or locking member 30. Locking member 30 is constructed substantially in the same manner as shown at 26 in FIG. 7, however, with the difference that in FIG. 9 the polygonal section 31 of the locking member 30 is arranged between spring windings rather than at the bottom of the spring windings. The two end sections 32, 33 of the locking member 30 are provided with extensions 34 and 35 reaching into the cotter pin hole 8 in the upper free end of the bolt 4. The transition sections 36, 37 leading from the upper windings to the extensions 34, 35 are provided as eyelets or grips for holding the locking member 30. Additionally, the connector comprises the components 2 to 9 as described above.

Figure 11:
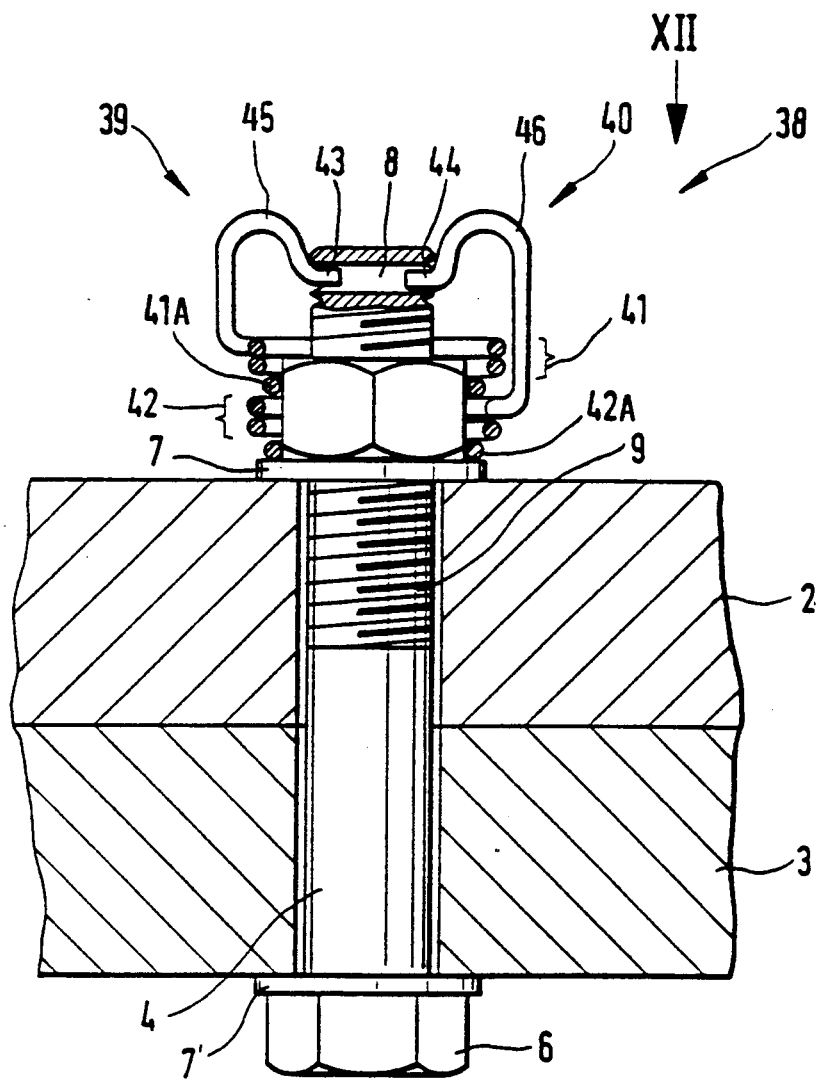
FIG. 11 shows an embodiment using two shaped springs as locking members.
Figure 12:
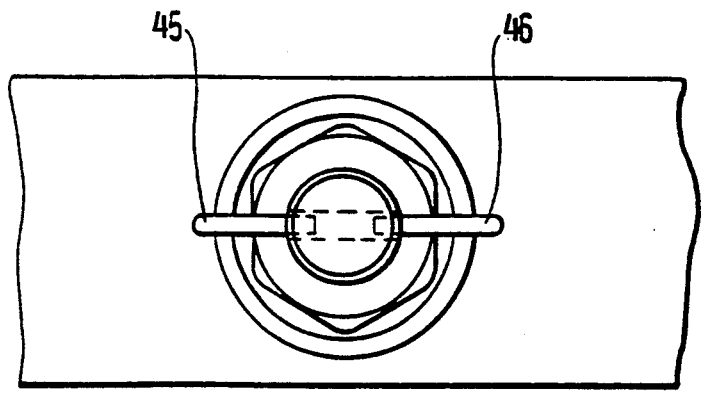
FIG. 12 is a top plan view of the embodiment of FIG. 11 in the direction of the arrow XII in FIG. 11.

FIGS. 11 and 12 show a further modification of a connector 38 with a locking member comprising two springs 39 and 40. Each locking member has its respective windings 41 and 42 and, there below, a hexagonal section 41A and 42A. Basically, each of the locking members 39 and 40 is constructed similarly to the configuration of the locking member 26 in FIG. 7. The transition area between the windings 41, 42 and the extensions 43, 44 reaching into the cotter pin hole 8, are constructed as a grip 45, 46 respectively. The remaining construction comprises the components 2 to 9 as described.

Figure 13:
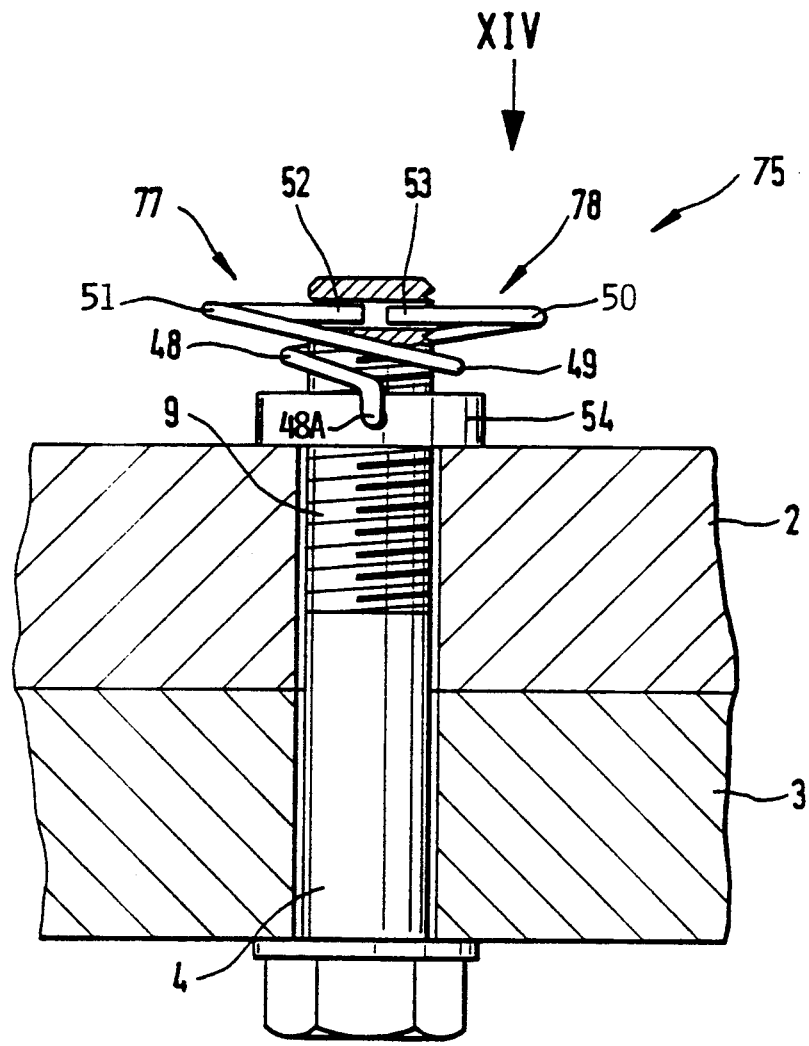
FIG. 13 shows an embodiment with a cross-hole nut engaged by two locking spring members.
Figure 14:
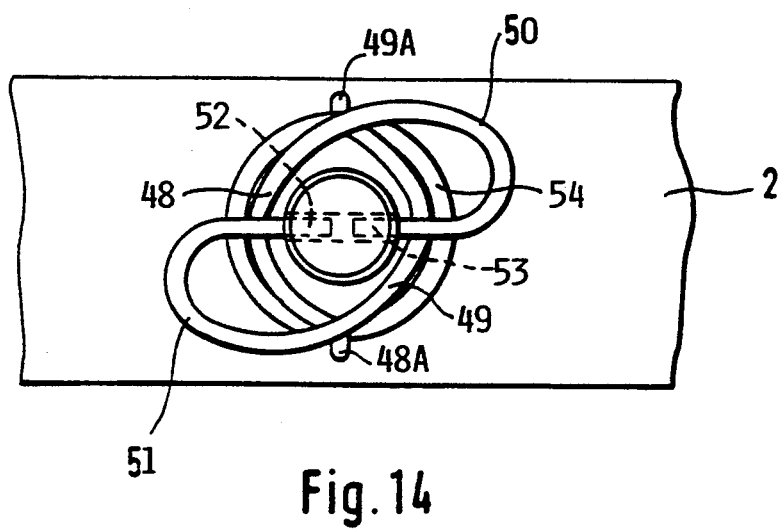
FIG. 14 is a top plan view in the direction of the arrow XIV in FIG. 13.

FIGS. 13 and 14 illustrate a screw connection 75 with two configured locking springs or members 77 and 78. Each has a spring section 48, 49 connected through a loop 50, 51 to an end projection 52, 53 reaching into a cotter pin hole from opposite ends. The lower end 48A of the spring section 48 and the lower end 49A of the spring section 49 are also constructed as a projection reaching into a respective hole of a so-called cross-hole nut 54 which, as such is conventional, for example, in accordance with German Industrial Standards DIN 548 and 1816. Such a nut has a cross-hole extending radially through the nut. With the exception of the components 5 and 7, the screw connector 75 also comprises the components 2, 3, 4, 6, 8, and 9 as described above. The cross-hole nut 54 may also be replaced by a so-called two-hole nut in accordance with German Industrial Standard DIN 547.

Figure 15:
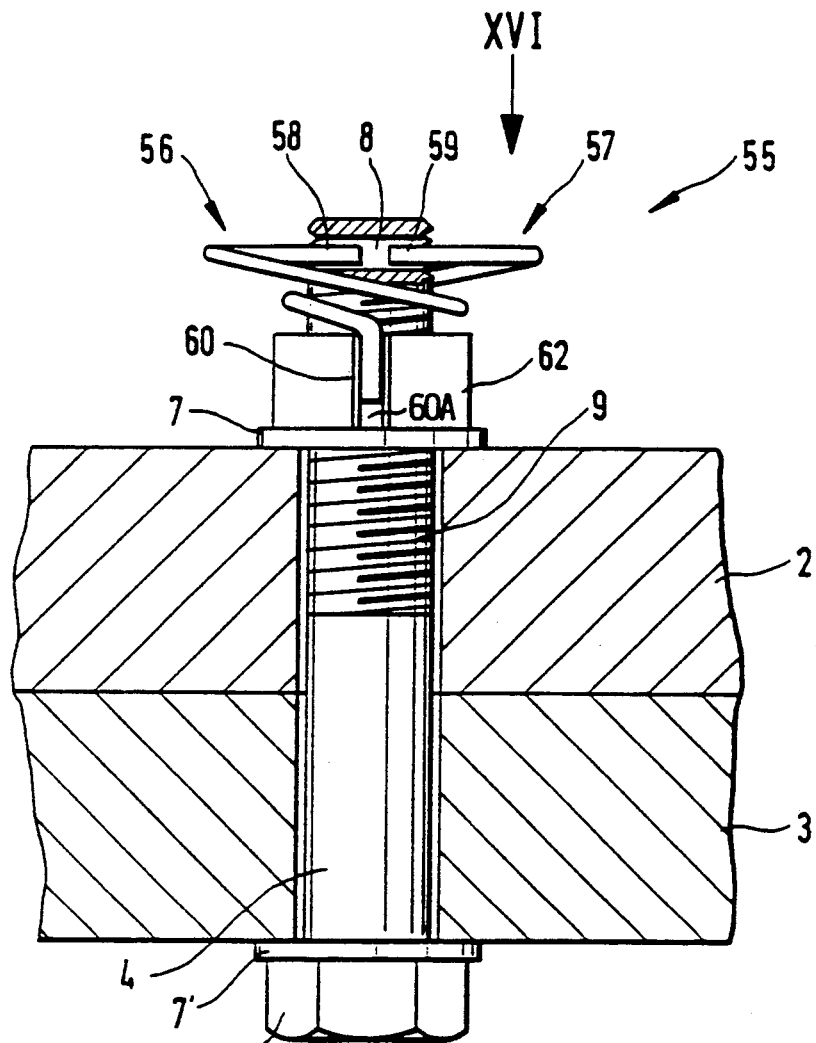
FIG. 15 shows an embodiment with a nut having at least one, preferably two, axially outer grooves for receiving the respective end or ends of a locking member or members.
Figure 16:
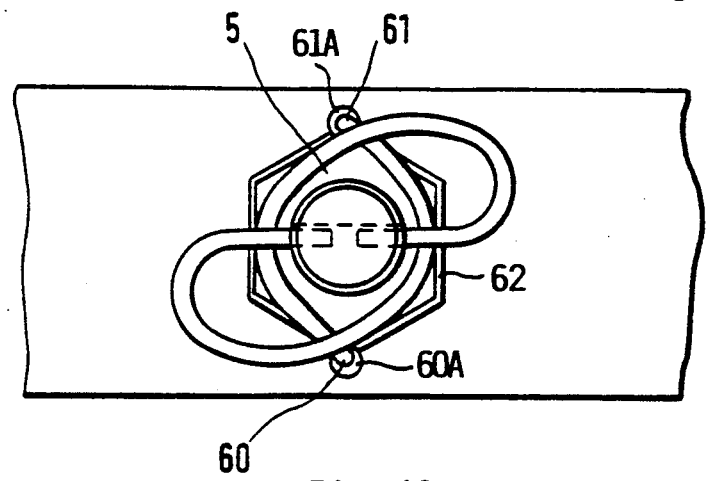
FIG. 16 is a top plan view in the direction of the arrow XVI in FIG. 15.

FIGS. 15 and 16 show a screw connector 55 illustrating yet another embodiment of the invention in which two configured spring members or locking members 56, 57 are used. These locking members have projections 58, 59 engaging the cotter pin hole 8 just as in the other figures, for example 13 and 14. The lower ends of the springs are provided with an axially, extending projection 60, 61 respectively, and these projections reach into axial grooves 60A, 61A respectively, provided in a nut cage 62 having a hexagonal configuration for engaging the nut 5. Thus, the nut cage 62 is connected to the nut 5 in a form-locking manner. For this purpose, the inner contour of the nut cage 62 corresponds to the outer contour of the nut 5. The two grooves or holes 60A and 61A may be arranged diagonally opposite each other as best seen in FIG. 16.

Figure 17:
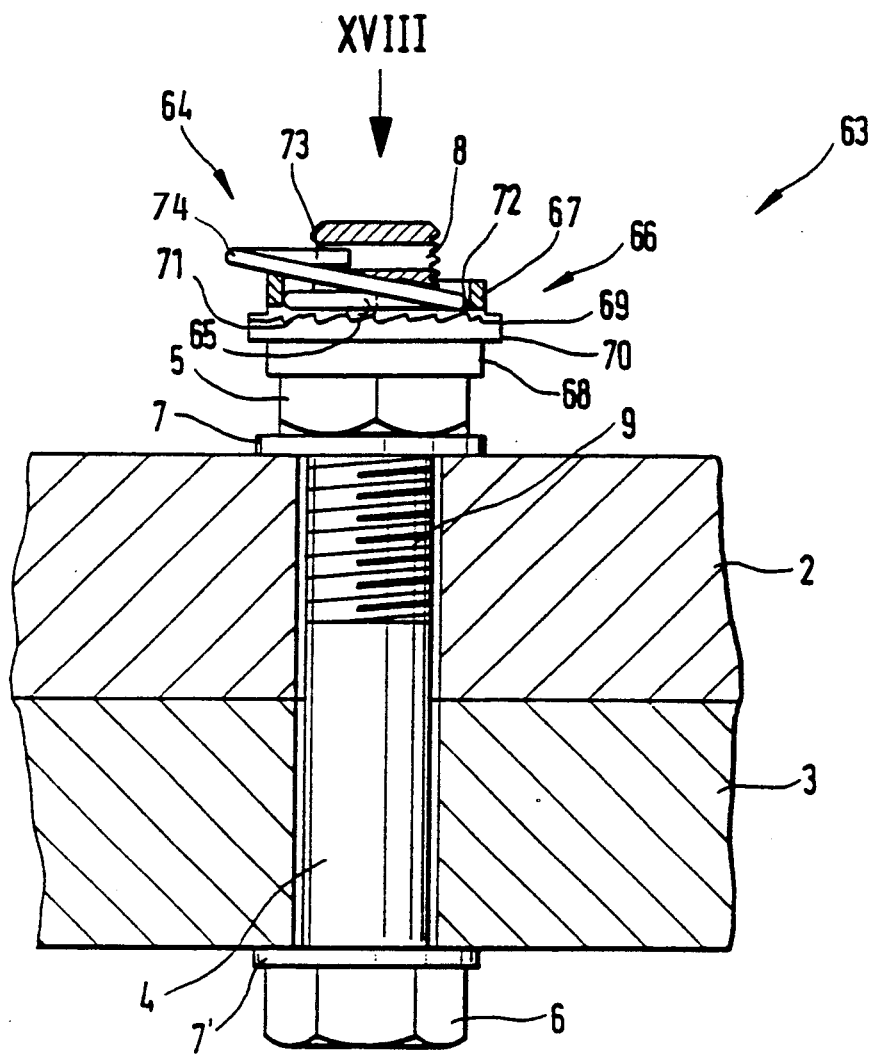
FIG. 17 is still another embodiment in which the locking member is secured to the nut by a camming device.
Figure 18:
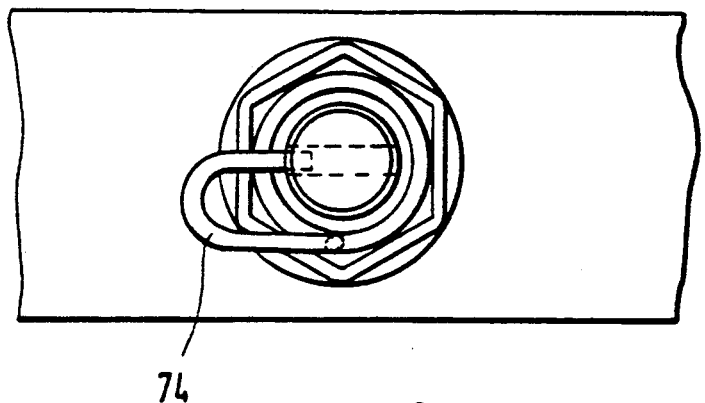
FIG. 18 is a top plan view in the direction of the arrow XVIII in FIG. 17.

FIGS. 17 and 18 illustrate another screw connector 63 according to the invention, whereby a hexagonal nut 5 is used as in the other embodiments. A locking member 64 in the form of a configured spring, is provided with a first end 73 engaging the cotter pin hole 8 and with a second end 65 shaped for cooperation with a two component ratchet device 66. The two component ratchet device 66 comprises an upper component 67 and a lower component 68, each provided with a respective, collar 69, 70. Each collar is provided with respective ratchet teeth 71, 72 having a saw-tooth configuration and extending radially relative to the central longitudinal axis of the bolt 4. Each component 67, 68 of the collars 69, 70, is constructed as a disk the disk is disks are also provided with lateral radially outwardly positioned bores extending in parallel to the central axis of the bolt 4 for engaging the second end 65 of the locking spring member 64. The two components 67, 68 of the ratchet device 66 are so arranged that the respective ratchet teeth 71, 72 face each other and mesh with each other. Due to the sawtooth configuration of the ratchet teeth, the components 67, 68 provide a ratchet mechanism that is effective as a locking device in one direction and as an unlocking device in the other direction of rotation around the longitudinal axis of the bolt 4. When, viewing the locking member 63 in the direction of the arrow XVIII, the rotation of the component 67 relative to the other component 68 is possible only counterclockwise. The inner surfaces of the two components 67, 68 have a contour for cooperation with the outer contour of the nut 5.

The outer circumferential surfaces of the ratchet components 67, 68, with the exception of the collars 69, 70, have an outer configuration for cooperation with a wrench, for example a hexagonal configuration. The ratchet component 68 engages the nut 5. The installation of the locking spring member 64 with its ratchet components is performed after the nut 5 of the screw connector 63 has been tightened to a predetermined tightening torque moment. Thereafter, the two ratchet components 67, 68 are installed as shown in FIG. 17, so that the inner portion of the collar 70 rests against the free facing surface of the nut 5. Thereafter, the locking spring member 64 is so installed into the ratchet component 67, that the lower or second end 65 of the spring member 64 is inserted into the above mentioned lateral bore and the upper or first end 73 of the spring locking member 64 engages the cotter pin hole 8. The engagement of the first spring end 73 with the hole 8 is facilitated by the grip section 74.

The spring locking member 64 has such a configuration that after its insertion, a compressive axial force is applied to the ratchet components 67 and 68. A wrench is now used to turn the ratchet component 67 counterclockwise for cocking the spring locking member 64, whereby the sawtooth ratchet teeth 71, 72 of the two collars 69 and 70 slide over one another. When the wrench is removed from the ratchet component 67, the ratchet teeth 71, 72 engage each other in such a manner that the spring locking member 64 applies a tightening torque momement to the nut 5 through the two ratchet components 67 and 68. The present locking members in the form of configured springs are suitably manufactured of spring steel wire. However, any other suitable spring material may be used. Normally, the spring wire will have a round cross-section. However, other suitable cross-sections for the spring wire are possible, such as a square cross-section or a rectangular cross-section.

Although the invention has been described with reference to specific example embodiments, it will be appreciated that it is intended to cover all modifications and equivalents within the scope of the appended claims.

What I claim is:

1. A screw connector for securing components to each other, comprising a screw bolt with a cotter pin hole and a nut, spring locking means for engaging said bolt and said nut, said spring locking means comprising at least one configured spring member having a first spring portion for engaging said cotter pin hole and a second spring portion for engaging said nut, said configured spring member further comprising between said first and second spring portions an intermediate spring section shaped for exerting a nut tightening torque moment on said nut while simultaneously exerting an axial compression force when said first and second spring portions are engaged, and wherein said configured spring member comprises a first plurality of windings and a second plurality of windings, and a polygonal section between said first and second windings, and wherein said windings are provided with end projections forming said first spring portion for insertion into said cotter pin hole, said polygonal section forming said second spring portion for engaging said nut.

2. The screw connector of claim 1, wherein said polygonal section comprises a helix between said first and second plurality of windings and a loop forming a grip.

3. The screw connector of claim 1, wherein said polygonal section comprises a polygonal configuration adapted to an outer configuration of said nut.

4. The screw connector of claim 2, wherein said loop forming a grip is an upwardly directed bail forming said grip.

5. A screw connector for securing components to each other, comprising a screw bolt with a cotter pin hole and a nut, spring locking means for engaging said bolt and said nut, said spring locking means comprising at least one configured spring member having a first spring portion for engaging said cotter pin hole and a second spring portion for engaging said nut, said configured spring member further comprising between said first and second spring portions an intermediate spring section shaped for exerting a nut tightening torque moment on said nut while simultaneously exerting an axial compression force when said first and second spring portions are engaged, wherein said spring locking means comprise two spring members each having a winding section and a polygonal section connected to said winding section, and wherein a transition portion between said winding section and said first spring portion forming a projection for engaging said cotter pin hole, is constructed as a respective grip.

6. The screw connector of claim 1, wherein said nut has a cross-hole extending radially to a rotational axis of said nut, and wherein said spring locking means comprise two spring members, each having said second spring portion as a spring end formed as a projection for engaging one of two holes arranged opposite each other in said nut.

7. The screw connector of claim 1, wherein said nut comprises at least two radially extending holes in said nut, said spring locking means comprising two spring sections, each spring section having a lower projection for engaging one of said holes arranged opposite the other hole in said nut.

8. The screw connector of claim 1, further comprising a nut cage for connecting said second spring portion to said nut, wherein said spring locking means comprise two spring sections having a lower projection inserted into said nut cage.

9. A screw connector for securing components to each other, comprising a screw bolt with a cotter pin hole and a nut, spring locking means for engaging said bolt and said nut, said spring locking means comprising at least one configured spring member having a first spring portion for engaging said cotter pin hole and a second spring portion for engaging said nut, said configured spring member further comprising between said first and second spring portions an intermediate spring section shaped for exerting a nut tightening torque moment on said nut while simultaneously exerting an axial compression force when said first and second spring portions are engaged, further comprising a ratchet device including two ratchet components comprising interengaging ratchet teeth for providing an adjustable connection between said nut and said second spring portion, each ratchet component having a collar carrying on its axially facing surface said interengaging ratchet teeth, each ratchet component further comprising a disk surrounded by said collar, each disk having a through-hole for said screw bolt and at least one axially extending lateral bore for holding an end of said second spring portion.

10. The screw connector of claim 9, wherein said two ratchet components have a substantially identical configuration.

11. The screw connector of claim 9, wherein said interengaging ratchet teeth have a sawtooth configurations that engage each other and permit an adjustment rotation of one ratchet component relative to the other ratchet component in a nut tightening direction, but are locked with each other in a nut loosening direction.

* * * * *